US012010982B2

(12) United States Patent
Alinger

(10) Patent No.: US 12,010,982 B2
(45) Date of Patent: *Jun. 18, 2024

(54) VIDEO FISHING SYSTEM WITH ELECTRICALLY-CONDUCTIVE FISHING LINE

(71) Applicant: ReelView Fishing, Inc., Boston, MA (US)

(72) Inventor: Dustin Alinger, Boston, MA (US)

(73) Assignee: ReelView Fishing, Inc., Boston, MA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/227,938

(22) Filed: Jul. 30, 2023

(65) Prior Publication Data

US 2024/0000058 A1 Jan. 4, 2024

Related U.S. Application Data

(63) Continuation of application No. 18/090,189, filed on Dec. 28, 2022, which is a continuation-in-part of
(Continued)

(51) Int. Cl.
| | |
|---|---|
| *A01K 97/12* | (2006.01) |
| *A01K 91/00* | (2006.01) |
| *H01B 3/08* | (2006.01) |
| *H01B 3/48* | (2006.01) |
| *H04B 3/02* | (2006.01) |
| *H04N 23/66* | (2023.01) |
| *H04N 23/698* | (2023.01) |

(52) U.S. Cl.
CPC ............ *A01K 97/125* (2013.01); *A01K 91/00* (2013.01); *H01B 3/081* (2013.01); *H01B 3/48* (2013.01); *H04B 3/02* (2013.01); *H04N 23/66* (2023.01); *H04N 23/698* (2023.01)

(58) Field of Classification Search
None
See application file for complete search history.

(56) References Cited

U.S. PATENT DOCUMENTS

| | | | |
|---|---|---|---|
| 3,334,436 A | 8/1967 | Cole, Jr. | |
| 3,717,858 A * | 2/1973 | Hadden | G08C 19/26 |
| | | | 323/224 |

(Continued)

OTHER PUBLICATIONS

International Search Report for PCT/US2022/034883, Nov. 17, 2022, 5 pages.
Written Opinion for PCT/US2022/034883, Nov. 23, 2021, 9 pages.

*Primary Examiner* — Eileen M Adams
(74) *Attorney, Agent, or Firm* — Danielson Legal LLC

(57) ABSTRACT

An electrical transmission line cable suited for a variety of applications, including as a fishing line in a video fishing system. The electrical transmission line cable has a first conductor and a second conductor forming an electrical transmission line; a jacket containing the first conductor and the second conductor; and a transmission line primary dielectric element separating the first conductor and the second conductor, wherein the primary dielectric element is at least one of textile yarns, fiber yarns, or monofilaments. The electrical transmission line may be in a balanced configuration or an unbalanced configuration.

20 Claims, 5 Drawing Sheets

Related U.S. Application Data application No. PCT/US2022/034883, filed on Jun. 24, 2022.

(60) Provisional application No. 63/214,692, filed on Jun. 24, 2021.

(56) References Cited

U.S. PATENT DOCUMENTS

| | | |
|---|---|---|
| 3,916,555 A | 11/1975 | Booth |
| 5,042,903 A | 8/1991 | Jakubowski |
| 5,546,695 A * | 8/1996 | Langer ............... A01K 97/00 87/7 |
| 5,581,930 A | 10/1996 | Langer |
| 2003/0223822 A1* | 12/2003 | Oldervoll ............... G01V 1/201 405/158 |
| 2011/0301944 A1 | 12/2011 | Rhodes et al. |
| 2012/0090289 A1* | 4/2012 | Cook ..................... D02J 1/22 57/58.86 |
| 2018/0174710 A1* | 6/2018 | Rogers ............... H01B 11/1834 |
| 2018/0322980 A1* | 11/2018 | Leach .................... H01B 3/081 |
| 2019/0000049 A1* | 1/2019 | Bonutti ................ A01K 85/00 |
| 2021/0081346 A1* | 3/2021 | Nixon .................... H04L 69/18 |

* cited by examiner

VIDEO FISHING SYSTEM WITH ELECTRICALLY-CONDUCTIVE FISHING LINE

CROSS-REFERENCE TO RELATED APPLICATIONS

The present application is a continuation of U.S. patent application Ser. No. 18/090,189, filed on Dec. 28, 2022, which claims the benefit of and priority to U.S. provisional application No. 63/214,692, filed on Jun. 24, 2021, and PCT application no. PCT/US2022/034883, filed on Jun. 24, 2022, the entire disclosure of each of which is hereby incorporated by reference as if set forth in their entirety herein.

TECHNICAL FIELD

Embodiments described herein relate to a multi-purpose electrical transmission line cable and, more particularly but not exclusively, to an electrical transmission line cable suitable for use in a video fishing system and other data and power transmission applications.

BACKGROUND

It is well understood that wireless electromagnetic communication systems (e.g., Wi-Fi, Bluetooth) suffer from dramatically reduced range in an underwater environment. Due to the significant signal attenuation these systems are subject to in water, range is limited to inches or a few feet at best. Acoustic communication methods can achieve significant range underwater (up to many kilometers), but their channel capacity (50 kbps or less) is orders of magnitude lower than that required for real time transmission of encoded video. Additionally, underwater acoustic communications require significant power that makes them unsuitable for their use in recreational applications such as fishing. Wireless optical underwater communications can achieve the data rates required for real time transmission of encoded video (1-5 Mbps) and can achieve ranges of 1-15 meters depending on water conditions, but their cost, size, power consumption, and directionality requirements make them wholly unsuitable for use in recreational applications such as fishing.

Given the drawbacks of these wireless technologies, a wired approach, either electrical or optical, is often necessary for underwater environments. An optical fiber, either silica core or polymer based, can achieve the necessary data rate for encoded video transfer over the distances used in typical fishing setups, and may even achieve a data rate high enough such that video compression is unnecessary. Power can also be sent over the optical fiber, but the transfer efficiency of such technologies is so poor that to be able to deliver the necessary amount of power to a camera module would necessitate an extremely high input power being launched into the fiber. Such a large input power sent into the fiber presents severe safety risks and such a system would also be prohibitively expensive. Additionally, the low transfer efficiency would severely limit battery life of the system and/or require unreasonably large batteries in a base station. Realistically, a battery would be required inside the camera module which has severe impacts on its size and buoyancy. Finally, and perhaps most importantly, optical fibers are far too fragile to withstand the rigors of recreational applications such as fishing.

A need therefore exists for improved apparatus and methods for the delivery of data and power in underwater environments.

SUMMARY

This summary is provided to introduce a selection of concepts in a simplified form that are further described below in the Detailed Description section. This summary is not intended to identify or exclude key features or essential features of the claimed subject matter, nor is it intended to be used as an aid in determining the scope of the claimed subject matter.

According to one aspect, embodiments herein relate to an electrically-conductive fishing line having a first conductor, a second conductor, a transmission line primary dielectric element separating the first conductor and the second conductor, and a jacket containing the first conductor, the second conductor, and the primary dielectric element, wherein the primary dielectric element includes at least one of textile yarns, fiber yarns, or monofilaments and wherein the first conductor, the second conductor, and the primary dielectric element form an electrical transmission line.

In some embodiments, the electrical transmission line is of a balanced configuration.

In some embodiments, the electrical transmission line is of an unbalanced configuration.

In some embodiments, the first conductor and the second conductor are twisted about the primary dielectric element.

In some embodiments, the first conductor and the second conductor are not twisted about the primary dielectric element.

In some embodiments, power is transmitted over the fishing line using a combination of high voltage and low current.

In some embodiments the fishing line includes at least one secondary dielectric element. In some embodiments, the at least one secondary dielectric element may be twisted about the primary dielectric element. In some embodiments, the at least one secondary dielectric element is not twisted about the primary dielectric element.

In some embodiments, the fishing line has a specific gravity between approximately 0.97 and approximately 2.0.

In some embodiments, the fishing line has a proximal end and a distal end, and there is a connector at each of the proximal end and the distal end.

In some embodiments, the primary dielectric element is a yarn having a high strength and a high modulus.

In some embodiments, at least one of the first or second conductors is uninsulated.

In some embodiments, at least one of the first or second conductors is magnet wire.

In some embodiments, at least one of the first or second conductors is enamel coated.

In some embodiments, the primary dielectric element is also a cable strength member.

In another aspect, embodiments herein relate to a video fishing system having a waterproof camera module; a base station module; and the electrically-conductive fishing line of any of the preceding claims connecting the waterproof camera module and the base station module.

In some embodiments, the waterproof camera module is configured to be a fishing lure.

In some embodiments, the base station module is integrated into a fishing rod or reel.

In some embodiments, the camera module has multiple image sensors for creating a panoramic-view image.

In some embodiments, the video fishing system includes an electrical safety mechanism between the fishing line and at least one of the camera module or the base station module.

In some embodiments, data is transmitted over the fishing line. Data may be transmitted using 10Base-T1L, Orthogonal Frequency Division Multiplexing, or powerline modem signaling.

In yet another aspect, embodiments herein relate to an electrical transmission line cable having a first conductor and a second conductor forming an electrical transmission line; a jacket containing the first conductor and the second conductor; and a transmission line primary dielectric element separating the first conductor and the second conductor, wherein the primary dielectric element includes at least one of textile yarns, fiber yarns, or monofilaments.

In some embodiments, the electrical transmission line is of a balanced configuration.

In some embodiments, the electrical transmission line is of an unbalanced configuration.

In some embodiments, the first conductor and the second conductor are twisted about the primary dielectric element.

In some embodiments, the first conductor and the second conductor are not twisted about the primary dielectric element.

In some embodiments, power is transmitted over the electrical transmission line cable using a combination of high voltage and low current.

In some embodiments, data is transmitted over the electrical transmission line cable. Data may be transmitted using 10Base-T1L, Orthogonal Frequency Division Multiplexing, or powerline modem signaling.

In some embodiments, the transmission line includes at least one secondary dielectric element. In some embodiments, the at least one secondary dielectric element is twisted about the primary dielectric element. In some embodiments, the at least one secondary dielectric element is not twisted about the primary dielectric element.

In still another aspect, embodiments herein relate to a balanced electrical transmission line structure wherein a dielectric element is also used as a cable strength member and the transmission line structure is not braided.

In yet another aspect, embodiments herein relate to a video fishing system utilizing an electrical fishing line that contains electrical conductors of size 34 AWG or smaller and sends power over the electrical fishing line using a combination of high voltage and low current. In some embodiments, the video fishing system includes an electrical safety mechanism governing the voltage and/or current on the electrical fishing line.

In still another aspect, embodiments herein relate to a video fishing system utilizing an electrical fishing line that contains electrical conductors of size 34 AWG or smaller and sends data over the electrical fishing line using either 10Base-T1L, Orthogonal Frequency Division Multiplexing, or powerline modem signaling.

BRIEF DESCRIPTION OF DRAWINGS

Non-limiting and non-exhaustive embodiments of this disclosure are described with reference to the following figures, wherein like reference numerals refer to like parts throughout the various views unless otherwise specified.

DETAILED DESCRIPTION

Figure 1:
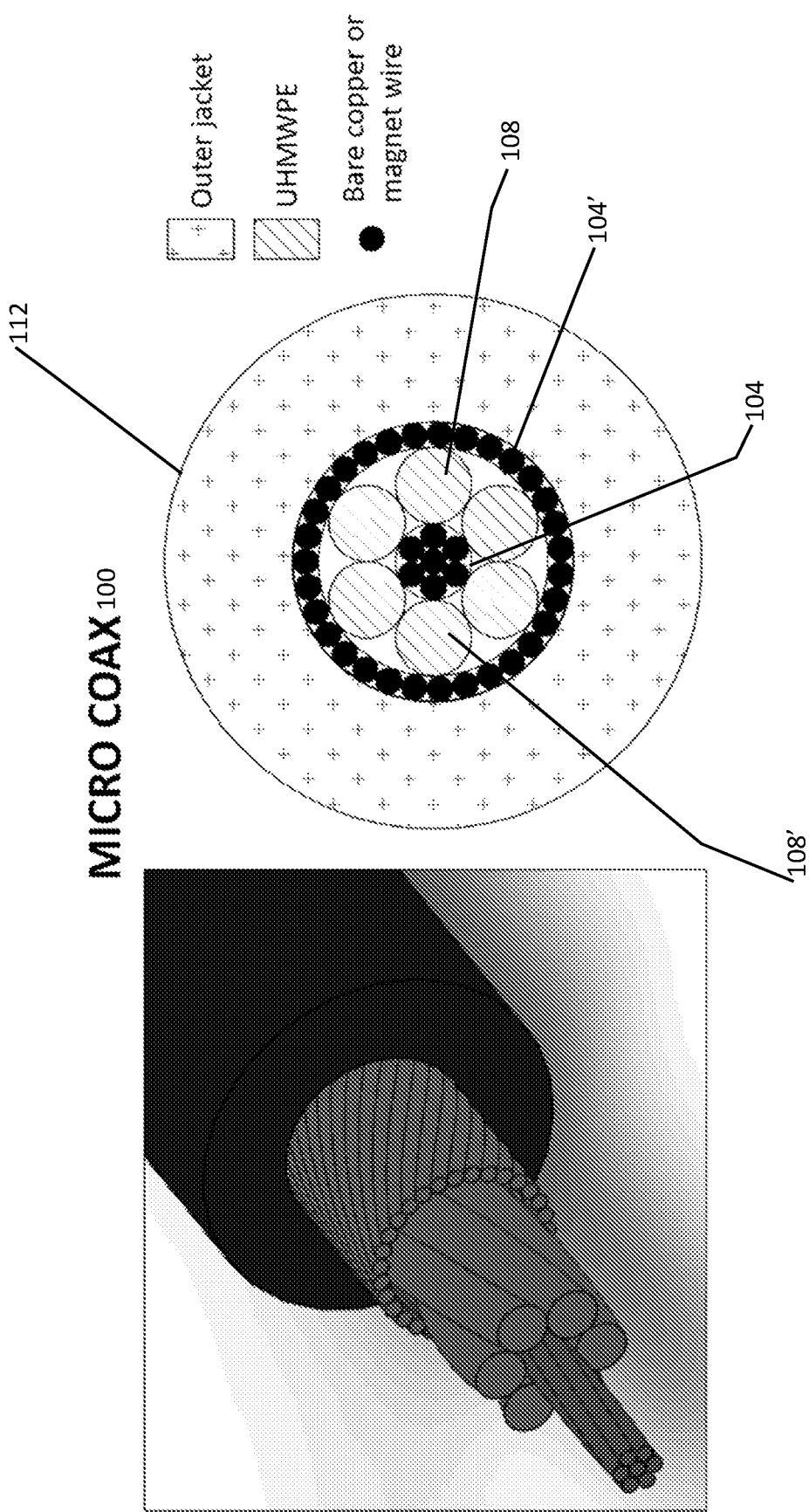
FIG. 1 depicts a 3D view and a cross sectional view of an unbalanced electrical transmission line cable in accord with one embodiment.

Various embodiments are described more fully below with reference to the accompanying drawings, which form a part hereof, and which show specific exemplary embodiments. However, the concepts of the present disclosure may be implemented in many different forms and should not be construed as limited to the embodiments set forth herein; rather, these embodiments are provided as part of a thorough and complete disclosure, to fully convey the scope of the concepts, techniques and implementations of the present disclosure to those skilled in the art. Embodiments may be practiced as methods, systems or devices. Accordingly, embodiments may take the form of a hardware implementation, an entirely software implementation or an implementation combining software and hardware aspects. The following detailed description is, therefore, not to be taken in a limiting sense.

Reference in the specification to "one embodiment" or to "an embodiment" means that a particular feature, structure, or characteristic described in connection with the embodiments is included in at least one example implementation or technique in accordance with the present disclosure. The appearances of the phrase "in one embodiment" in various places in the specification are not necessarily all referring to the same embodiment.

In addition, the language used in the specification has been principally selected for readability and instructional purposes and may not have been selected to delineate or circumscribe the disclosed subject matter. Accordingly, the present disclosure is intended to be illustrative, and not limiting, of the scope of the concepts discussed herein.

Embodiments of the invention relate to an electrical transmission line cable having multiple conductors arranged in a balanced or unbalanced configuration within a jacket. A dielectric element having at least one of textile yarns, fiber yarns, or monofilaments separates the conductors and can, in some embodiments, be a cable strength member.

Additional embodiments of the invention relate to a video fishing system.

Electrical Transmission Line Cable

In various embodiments, the electrical transmission line cable is made up of two or more electrical conductors that are electrically insulated from one another. The conductors are arranged in a coaxial, twisted pair, or untwisted pair configuration, though other configurations are possible. There may be an electromagnetic metallic shield, either foil and/or spiraled and/or braided, around the conductors. In addition to the conductors, there are one or more strength members inside the electrical transmission line to withstand axial forces. One or more outer jackets may surround the conductors and strength member(s) to provide protection and waterproofing and to keep the line's interior components contained and properly located. The strength members may also be high modulus i.e., low stretch, which protects the conductors and/or jacket and/or other cable components from stretching to their yield or failure point, therefore stabilizing the transmission properties of the cable under load. Connectors (discussed below), if included, are most likely overmolded onto the electrical transmission line to provide a means of attachment and a waterproof and rugged seal, though other sealing methods are possible.

In order to reduce line diameter while also helping to achieve neutral to slightly negative buoyancy, it can be advantageous to reduce the weight of the electrical conductors while still providing adequate conductivity. In order to reduce conductor weight, it can be advantageous to use aluminum rather than copper as the material for the electrical conductors due to its superior conductivity-to-density ratio. The conductivity-to-density ratio for aluminum is approximately 14000 S*m^2/g, compared to approximately 6700 S*m^2/g for copper. To increase the ease of solderability to the end of the wires, copper clad aluminum is a good choice for conductor material. However, in many designs it is still possible to achieve the desired buoyancy while using copper as the conductor material.

Copper clad steel may be chosen due to its superior strength and toughness to that of copper at the expense of conductivity. To increase flex life and flexibility, metal-clad or metal-doped fibers or certain copper alloys may be used. Carbon nanotube yarns can also offer substantially increased flex life and flexibility and may be a good option when cost permits.

Electrical transmission lines are characterized by the geometry and material properties of the conductors and the dielectric. The dielectric in a coaxial line is the annulus of material between the inner and outer conductor. The dielectric in a twisted pair transmission line is the material between the two conductors, typically the insulating jacket that surrounds each wire. Selecting a dielectric material with a lower relative permittivity (also known as the dielectric constant) will reduce the attenuation of the transmission line, allowing for signals to be successfully transmitted over longer lengths of line.

Due to its low dielectric constant and high strength, ultra-high-molecular-weight polyethylene (UHMWPE) (or other "super fibers" such as Zylon, Vectran, Kevlar, etc., many of which exhibit high strength and low dielectric constant) can be used as both the strength member and the transmission line dielectric material within the electrical transmission line cable. The low density of UHMWPE (specific gravity=0.97) helps to increase the buoyancy of the electrical transmission line cable. Additionally, because most super fiber yarns, including UHMWPE, are actually bundles of very small filaments (the diameter of the filaments is on the order of microns), they offer superior flex life and flexibility. It should be noted that UHMWPE is the material used in braided fishing lines, as it has many mechanical properties that make it suitable for use as fishing line. Specific strength (also known as "strength to weight ratio") is also an important design parameter for electrical cable strength members since the density of the material is important, as previously explained. UHMWPE, Zylon, Vectran, and other super fibers all exhibit some of the highest specific strengths of any materials available today (considerably higher than titanium, for example). In the constructions shown herein, the UHMWPE serves not only as strength member and transmission line dielectric, but also as a buoyancy enhancer and as a cable filler to occupy what would otherwise be void space in the cable's interior. The same design and construction principles could be used with any other super fibers or traditional fibers, or any synthetic fibers e.g., nylon, fiberglass, or any natural fibers e.g., cotton.

Properties to consider for the fibers used in the electrical transmission line cable are strength, density, filament size, flexibility, flex life, abrasion resistance, cut resistance, toughness, elastic modulus, dielectric constant, dielectric loss tangent, dielectric breakdown strength, coefficient of friction, UV resistance, chemical resistance, fungal resistance, hygroscopicity, hydrophobia, elongation at break, melting temperature, decomposition temperature, and others.

FIG. 1 depicts a 3D view and a cross sectional view of an unbalanced electrical transmission line cable 100 in accord with one embodiment. As shown, the conductors 104, 104' consist of bare copper or magnet wire and are arranged coaxially with conductor 104 forming an inner transmission path and conductor 104' forming an outer transmission path. Several textile yarns 108 made of ultra-high-molecular-weight polyethylene are used as the dielectric element of the electrical transmission line. The outer jacket 112 contains the conductors 104, 104' and the textile yarns 108.

In some embodiments, center conductor 104 is a stranded wire comprised of 7 individual approximately 45 AWG magnet wires twisted in a 6-around-1 configuration. The 45 AWG wires have a diameter of approximately 0.05 mm. Center conductor 104 has a diameter of approximately 0.15 mm.

In some embodiments, textile yarns 108 are approximately 150 denier yarns of UHMWPE that have each been twisted to give them a circular cross section having a diameter of approximately 0.15 mm.

In some embodiments, outer conductor 104 is comprised of many approximately 45 AWG magnet wires. The 45 AWG wires have a diameter of approximately 0.05 mm.

In some embodiments, Outer jacket 112 is a jacket having a wall thickness of approximately 0.25 mm.

In some embodiments, unbalanced electrical transmission line cable 100 has a diameter of approximately 1.05 mm.

Figure 2:
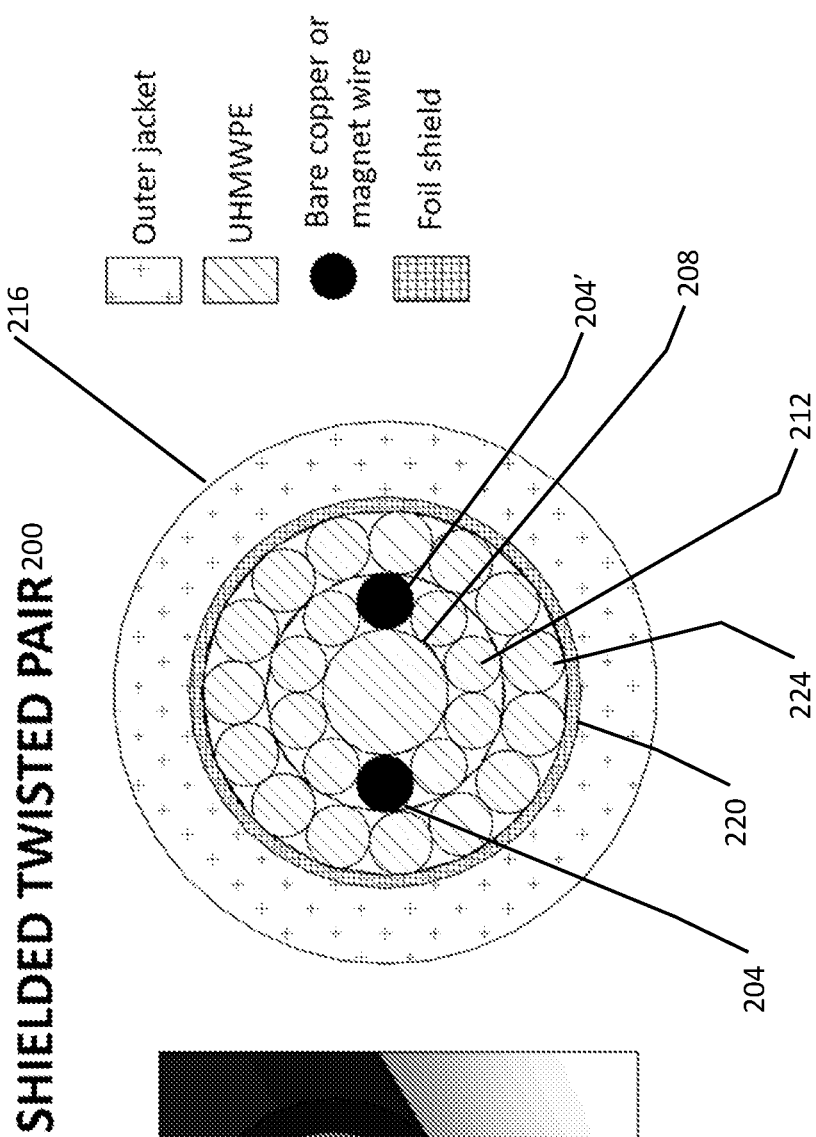
FIG. 2 depicts a 3D view and a cross sectional view of a shielded balanced electrical transmission line cable in accord with another embodiment.
Figure 2:
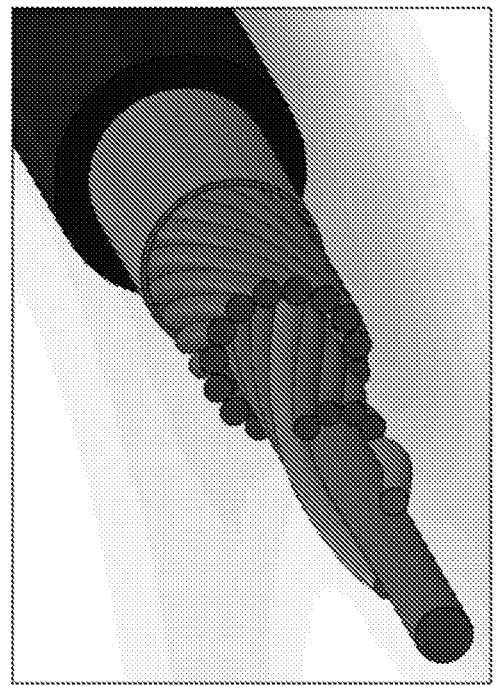

FIG. 2 depicts a 3D view and a cross sectional view of a shielded balanced electrical transmission line cable 200 in accord with another embodiment. As shown, the conductors 204, 204' are arranged in a shielded twisted pair arrangement (STP). A textile yarn made of ultra-high-molecular-weight polyethylene is used as the primary dielectric element 208 of the electrical transmission line, with additional textile yarns 212 surrounding the primary element 208 and providing structural support. An additional layer of textile yarns 224 surrounds the first layer textile yarns 212. The outer jacket 216 contains the conductors 204, 204' and the textile yarns 208, 212, 224. The foil 220 functions as an electromagnetic shield.

The yarns 208, 212, 224 may be fabricated from the same material or different materials selected so as to reduce the transmission line loss incurred due to the dielectric constant (also called relative permittivity) and/or the loss tangent of the transmission line dielectric member. For example, core fiber 208 may be a UHMWPE core fiber while fibers 212, 224 are made from Kevlar.

In some embodiments, center yarn 208 is an approximately 100 denier yarn of UHMWPE that has been twisted to give it a circular cross section having a diameter of approximately 0.13 mm.

In some embodiments, first layer outer yarns 212 are approximately 20 denier yarns of UHMWPE that have each been twisted to give them a circular cross section having a diameter of approximately 0.06 mm.

In some embodiments, conductors 204 and 204' are 44 AWG magnet wires having a diameter of approximately 0.06 mm.

In some embodiments, second layer outer yarns 224 are approximately 30 denier yarns of UHMWPE that have each been twisted to give them a circular cross section having a diameter of approximately 0.07 mm.

In some embodiments, foil shield 220 has a thickness of approximately 0.01 mm.

In some embodiments, outer jacket 216 is a jacket having a wall thickness of approximately 0.08 mm.

In some embodiments, shielded balanced electrical transmission line cable 200 has a diameter of approximately 0.57 mm.

Figure 3:
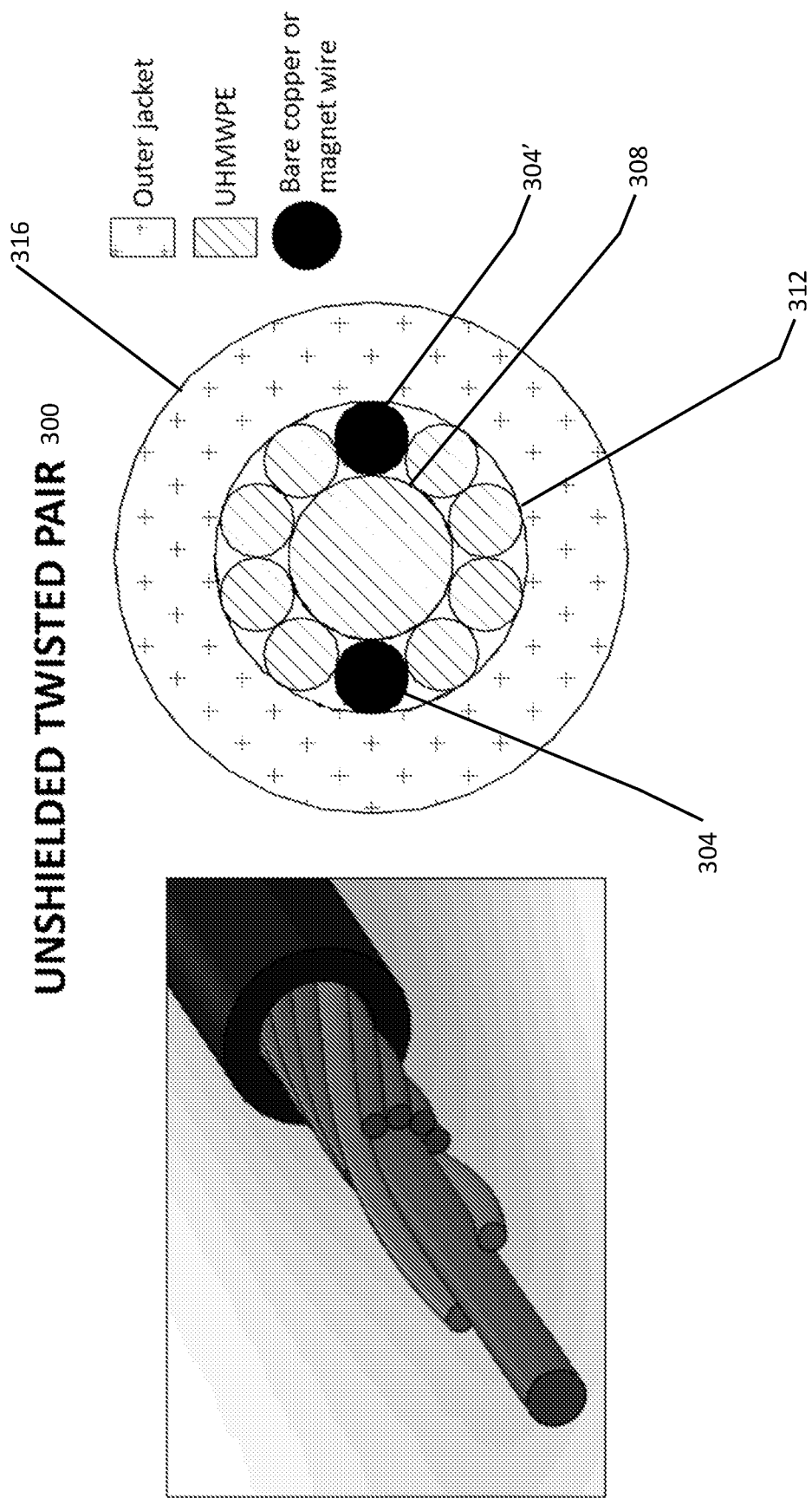
FIG. 3 depicts a 3D view and a cross sectional view of an unshielded balanced electrical transmission line cable in accord with yet another embodiment.

FIG. 3 depicts a 3D view and a cross sectional view of an unshielded balanced electrical transmission line cable 300 in accord with yet another embodiment. As shown, the conductors 304, 304' are arranged in an unshielded twisted pair arrangement (UTP). A textile yarn made of ultra-high-molecular-weight polyethylene is used as the primary dielectric element 308 of the electrical transmission line, with additional textile yarns 312 surrounding the primary element 308 and providing structural support. The outer jacket 316 contains the conductors 304, 304' and the textile yarns 308, 312. Unlike the embodiment of FIG. 2, the embodiment in FIG. 3 lacks shielding.

In some embodiments, center yarn 308 is an approximately 100 denier yarn of UHMWPE that has been twisted to give it a circular cross section having a diameter of approximately 0.13 mm.

In some embodiments, outer yarns 312 are approximately 20 denier yarn of UHMWPE that have each been twisted to give them a circular cross section having a diameter of approximately 0.06 mm.

As noted, the yarns 308, 312 may be fabricated from the same material or different materials selected so as to reduce the transmission line loss incurred due to the dielectric constant (also called relative permittivity) and/or the loss tangent of the transmission line dielectric member. For example, core fiber 308 may be a UHMWPE core fiber while fibers 312 are made from Kevlar.

In some embodiments, conductors 304 and 304' are 44 AWG magnet wires having a diameter of approximately 0.06 mm.

In some embodiments, outer jacket 316 is a jacket having a wall thickness of approximately 0.08 mm.

In some embodiments, unshielded balanced electrical transmission line cable 300 has a diameter of approximately 0.41 mm.

Note that the UBMWPE is represented as a hatched circle in these drawings, but in reality each hatched circle is made up of tens or hundreds of smaller filaments. Those filaments are bundled and sometimes also twisted together to form yarns of different deniers. Denier is a unit of measurement used in the textile industry. It is a measure of linear mass density and is equal to the mass (in grams) per 9000 meters of yarn.

Note also that all three concepts show bare copper or magnet wire for the conductors, but it is also possible to insulate these wires with a fluoropolymer or other insulating jacket to provide a secondary layer of protection in addition to the outer jacket (although the enamel coating on magnet wire already provides a layer of protection).

Measurements and experimentation have shown that the shield on the STP design is typically not necessary. Both the coax and STP concepts can be costly to produce. The UTP design can be very cost effective to produce as it involves twisting, cabling, and a single jacketing operation, and all these production operations can be run at high speeds.

The super fiber yarns are typically made by the bundling together of many smaller filaments. These bundles of filaments may be twisted or untwisted but can be twisted to encourage the yarn to have and maintain a circular shape (e.g., to increase the radial stiffness of the yarn) and to increase processability during manufacturing.

In the twisted pair designs (both UTP and STP and parallel pair), a super fiber yarn 208, 308 is located at the center of the cross section. Two or more conductors 204, 304, along with a plurality of super fiber yarns 212, 312, are arranged in a circular fashion around the center yarn 208, 308. Ideally, the conductors 204, 304 are diametrically opposed from one another about the center yarn, but limitations in available yarn sizes may require them to be slightly offset from perfectly diametrically opposed.

The conductors and the surrounding yarns are most likely spiraled about the center yarn in a helical fashion (twisted pair arrangement) but may be untwisted (parallel pair arrangement). Twisting of the conductors is well understood to have numerous advantages in terms of electromagnetic compatibility and performance and this technique has been in widespread use since its invention by Alexander Graham Bell in the 1880s. The surrounding yarns are likely similar in diameter to the conductors so as to encourage the entire bundle to have a mostly circular cross section, so that the final electrical transmission line cable will have a mostly circular shape. The surrounding yarns and/or the central yarn act as a strength member to bear the force imposed on the electrical transmission line cable. The yarns also act as a dielectric material which forms the distributed capacitance of the electrical transmission line.

Note that while the yarns 212, 312 are shown in the drawing as being perfectly circular and having some void space between one another, in reality there will be some degree of compaction and rearranging of the yarn filaments and the void space will be at least partially filled. In fact, it may be advantageous to design the surrounding yarns to have a certain degree of overlap with one another so as to encourage the void space to be filled as the surrounding yarns are twisted about the center yarn. Note that the center yarn is not required to be the same size as the surrounding yarns, nor is it required that the surrounding yarns are all the same size as one another. The direction of twist of the outer yarns about the central yarn may be left-hand, also called S-twist, right-hand, also called Z-twist, or the twist direction may change along the length of the line, also called SZ-twist. SZ-twist can provide the benefit of limiting or eliminating load-induced rotation, in which the line twists about its long axis when placed under tensile load.

With reference to FIG. 2, the center yarn 208 acts as both a strength member and as a conductor spacer and the primary dielectric element between the two conductors 204, 204' of the twisted pair transmission line 200. It is the primary dielectric element because the majority of the electric field strength is located in the region directly between the two conductors 204, 204', where the central yarn 208 is located.

It is well understood that the distance between the two conductors 204, 204' of the twisted pair has a significant impact on the electrical properties of the transmission line. Spacing the conductors 204, 204' farther apart reduces the attenuation of the transmission line, which is desirable as it allows for the transmitting of signals across longer lengths of cable before they are attenuated to a level below which a receiver can successfully receive them. In a conventional twisted pair, such as those used in Ethernet cables, the conductor spacing is typically set by the wall thickness of the insulation around the conductors, but in the design presented here the spacing is set by the diameter of the center yarn. Note that the conductors in the electrical transmission line cable may be bare copper, enameled or "magnet" wire, or insulated with a polymer as is typical in twisted pairs. If magnet wire is used, a thin coating of polyamide or other non-conductive material surrounds the conductor. The magnet wire coating is significantly thinner than the thickness of the center yarn so has a minimal effect on the dielectric properties of the transmission line. If the conductors are insulated with a polymer, it is advantageous to keep the insulation thickness as small as possible since the insulation will provide no benefit to the electrical transmission line cable i.e., it is not a strength member and it is most likely negatively buoyant. If the conductors are insulated with a polymer, the properties of the transmission line will be determined by the dielectric properties of both the insulating polymer and the central yarn. However, it is advantageous to eliminate the conductor insulation altogether (or to use a very thin coating, such as the enamel coating used on magnet wire) to reduce the overall size of the electrical transmission line cable.

As shown in FIG. 2, a second layer 224 of surrounding yarns may surround the first layer 212 of surrounding yarns. These second-layer yarns 224 may also be helically twisted about the central core 208, and the direction of spiral is most likely but not necessarily opposite of that to the first twisted layer 212 in order to minimize the net internal torque generated by the twisted yarns. This internal torque will tend to cause the electrical transmission line to "self-curl" or naturally shift itself into a circular shape. Additionally, the twist direction of the yarns themselves (i.e., the bundled filaments are twisted either clockwise or counterclockwise about the center of the bundle) may be alternated to minimize the internal torque. Any number of additional yarn layers may exist outside of the second layer.

Outside of all yarns and conductors, an electromagnetic shield (e.g., 220 in FIG. 2) may be included to improve electromagnetic compatibility and performance. This shield may take the form of a spiraled foil tape and/or individually spiraled or braided wires (e.g., 104' in FIG. 1). In addition to or instead of the electromagnetic shield may be a water swellable tape used to plug any tears or holes that develop in the outer jacket of the electrical transmission line cable when exposed to water. The yarns themselves may also be coated with a water swellable coating to achieve the same goal.

In the coaxial design of FIG. 1, the center member 104 is one of the two conductors. The center conductor 104 is surrounded by a plurality of super fiber yarns 108 that act as both strength member and transmission line dielectric. The outer conductor 104' of the coaxial design may take the form of a spiraled foil tape, or individually spiraled or braided wires, or both. In addition to the outer conductor, there may be a water swellable tape used to plug any tears or holes that develop in the outer jacket of the electrical transmission line cable when exposed to water. The yarns themselves may also be coated with a water swellable coating to achieve the same goal.

Outside of the conductors, yarns, and any shields and/or tapes is the outer jacket of the electrical transmission line cable (e.g., 216 in FIG. 2). The purpose of the outer jacket of the electrical transmission line cable is to protect the conductors, yarns, and any shields and/or tapes from the underwater environment by preventing the ingress of water and to provide a general protective jacket to the electrical transmission line cable so that it is rugged enough to withstand the rigors of use. There may be multiple outer jackets to provide additional degrees of protection. The color of the outer jacket(s) and interior materials (conductors, yarns, tapes, or shields) may be specifically chosen to provide an obvious visual indication to the user of a failure in the outer jacket by revealing a differently colored inner material. The jacket may have a nonuniform wall thickness along the length of the cable, e.g., the jacket may be thicker at its end where it connects to the camera, to provide additional robustness to this portion of the cable since this area of the cable may be subject to more frequent and/or vigorous stresses due to handling, etc.

There are many material choices available for the outer jacket and many factors to consider when selecting the material: density, toughness, minimum manufacturable wall thickness, UV resistance, abrasion resistance, cut resistance, strength, coefficient of friction, manufacturing processing temperature, elastic modulus, hygroscopicity, hydrophobia, fungal resistance, chemical resistance, and others. Cables designed for submersion in water often use either various polyurethanes or fluoropolymers for the outer jacket material. Other potential material options are thermoplastic elastomers, silicone, or others. Polyurethane has a favorably low density (specific gravity 1.0-1.2) but due to the manufacturing processes required for applying it, typically requires a wall thickness of at least 10 mil (0.25 mm). This jacket thickness has a significant impact on the overall electrical transmission line cable size. Fluoropolymers, such as PTFE, PFA, FEP, and ETFE have higher densities (specific gravity 1.6-2.5) but can be applied with a much thinner wall, down to as small as a 1.5 mil (0.04 mm) wall thickness. Reducing the wall thickness as much as possible helps to keep the electrical transmission line cable small and therefore similar in size to conventional fishing lines.

The jacket layer may be extruded over a bundle of conductors, yarns, tubes, etc. It may be advantageous to utilize pressure extrusion rather than tube extrusion for this manufacturing process. Extruding under pressure forces the jacket material to fill in any void or interstitial space within the cable core. By flowing the jacket material around the individual filaments of the high strength yarns in this manner, the mechanical coupling between the jacket and the yarns is enhanced. This reduces the likelihood that slippage will occur between the jacket and the cable core, which can lead to the jacket stretching and locally thinning, or to the jacket failing in tension, also called "shucking the core" or "de-sheathing."

The jacket layer may be extruded over a bundle of conductors, yarns, tubes, etc., or it may be formed as a layer of high strength yarns (e.g., UHWMPE) that is wrapped around the bundle and thermally fused using heat to form a jacket layer. Thermal fusing is a technique in which heat is applied to a high strength fiber yarn or group of yarns, typically UHMWPE yarns, in a controlled manner so that the outer surfaces of the individual filaments fuse together while the core of the filaments remains above a critical temperature near the melting point of the fiber. Preventing the core of the filaments from exceeding this critical temperature ensures that their highly aligned molecular structure, which is the property that provides the filaments with their high strength, remains intact so that the strength of the yarns remains high. A thermally fused jacket made from high strength fibers would provide additional tensile strength to the electrical transmission line cable. Fishing lines made from thermally fused UHMWPE are available and in use today.

Some embodiments of the foregoing transmission line cables may include an additional braided layer (not shown) surrounding the outer jacket layer 112, 216, 316. When a tensile force is applied to the braided layer it reduces in diameter and compress the transmission line cable and increase the mechanical coupling between the elements of the cable core (for example strength members 108, 208, 212, 224, 308, 312) and the outer jacket 112, 216, 316. The increase in mechanical coupling between the cable core and the cable jacket allows externally applied forces (for example, grabbing onto the cable jacket by hand and pulling on it) to be applied to the load-bearing high strength and high modulus fibers 108, 208, 212, 224, 308, 312 within the cable core, which protects the conductors 104, 204, 304 and jacket 112, 216, 316 from stretching to their yield or failure point, therefore stabilizing the transmission properties of the cable 100, 200, 300 under stress. The braided layer may be formed from any of the materials discussed above for use as strength members and dielectric materials (UHMWPE, Zylon, Vectran, Kevlar, etc.).

For all of these electrical transmission line cable designs, the size and/or number and/or material of the fiber yarns and/or conductors may be adjusted to increase or decrease the maximum axial breaking force and the overall diameter of the electrical transmission line cable, as well as the maximum achievable data transmission and power transmission length. An example UTP electrical transmission line cable, using 40AWG magnet wire conductors, a 50 denier UHMWPE central yarn, and six 50 denier UHMWPE surrounding yarns, with a fluoropolymer jacket having a thickness of 0.005", has an overall diameter of approximately 20 mils (0.50 mm) and a breaking force of approximately 30 lbs., which is similar in diameter and breaking strength that of 30 lb. test conventional monofilament fishing line. Its specific gravity is in the range of 1.9-2.3 depending on the outer jacket material used, which is similar to that of conventional fluorocarbon fishing line.

In an alternative embodiment (not shown), the center yarn is not present and instead the conductors and one or more yarns are bundled together and twisted. For example, two conductors and one yarn could be twisted together to form a twisted triple, or two conductors could be bundled with two yarns to form a twisted quad. This approach may be cost advantageous, but in order to provide adequate spacing between the two conductors to keep their attenuation low will require some insulating material on the wires that has some thickness to it. As mentioned previously, this insulating material provides insulation and protection to the conductors but does not act as a strength member or a buoyancy enhancer, so this design is less desirable overall, but may be more cost effective.

As discussed above, a low dielectric constant and/or low loss tangent for the transmission line dielectric is desirable because it reduces attenuation losses and improves transmission distance. Accordingly, in still another embodiment (not shown), the center "yarn" 208, 308 may be a hollow tube of a plastic such as PVC, vinyl, or another rigid plastic that may be melt processed to extrude a hollow tube. The tube's cavity may be air-filled or vacuum-filled (i.e., evacuated of contents and then sealed) as these approaches offer exceptionally low dielectric constants and loss tangents, or the cavity may be filled with some other material having low dielectric constant and/or loss tangent. Similarly, other embodiments (not shown) may use a monofilament with a low dielectric constant and/or low loss tangent as the center yarn 208, 308, such as PTFE or foamed PTFE.

For mechanical reasons, or manufacturing reasons, or to adjust the cable's buoyancy, or for other reasons, it may be desirable to use monofilaments in place of some of the high strength yarns. For example, using a monofilament in an outer location could provide enhanced radial stiffness to the cable core, or some other mechanically advantageous benefit. Accordingly, in still another embodiment (not shown), any of the "yarns" 108 208, 212, 224, 308, 312 may be a monofilament, such as PTFE, nylon, TPX, or other materials.

The conductors may be either solid core or stranded constructions. Stranded constructions offer the benefit of redundancy and may exhibit increased flex life and/or flexibility. However, stranded constructions are subject to higher costs. Alternatively, the conductors may be comprised of several smaller diameter magnet wires that are bundled together and possibly twisted.

The conductors of the magnet wire may be made from pure copper, a copper-clad metal, or an alloy with desirable mechanical properties e.g., flex life.

In alternative embodiments, the yarns and conductors may be arranged in other arrangements besides the concentric layered arrangements presented above.

Additionally, low density filler materials may be used in the cable construction to increase its buoyancy. For example, a low-density material such as polymethylpentene (TPX), which has a specific gravity of 0.83, may be included as the central member or as a non-central member. Its low dielectric constant of 2.12 makes it a good transmission line dielectric if it is the central member.

In some embodiments, the twist direction of the individual yarns and the twist direction of the yarns about the central or inner members may be selected so that the yarns themselves form a water-resistant seal that prevents the ingress of water into the interior of the cable where the conductors reside. The twist rate of the individual yarns or the twist rate of the yarns about the center may also be selected or adjusted to encourage this water-resistant sealing mechanism to form. In these constructions, it may be necessary to clamp or otherwise bind the ends of the cable to prevent these yarns from untwisting, or the outer jacket may serve to prevent the yarns from untwisting. These constructions are known in the nautical rope literature as "cable-laid" or "water-laid" constructions. If the yarns themselves form a water-resistant seal, the outer jacket may be entirely unnecessary or may be a redundant method of preventing water ingress.

Additionally, if the yarns are individually twisted, their twist rate per unit length may be selected so as to achieve or maintain ideal conductor spacing within the construction. For example, the center yarn may have a higher twist per unit length than the surrounding yarns so that it is more resistant to compaction, so that the conductors remain adequately spaced apart from one another and so that the two conductors remain diametrically opposed to each other about the central yarn. Alternatively, the central yarn may be twisted while some, all, or none of the surrounding yarns are untwisted. An advantage of leaving some or all of the surrounding yarns untwisted is that they may be more likely to take on a non-circular, irregular cross-sectional shape as necessary to fill in void space an encourage an overall roundness to the construction. Without individually twisting some or all of the yarns, yarn compaction is likely and the conductors may be able to migrate within the cross section into an undesirable configuration that would have detrimental impacts on transmission line and electromagnetic compatibility characteristics.

Additionally, the twist rate of the entire twisted structure (also referred to as "lay length") may be adjusted to optimize electromagnetic compatibility and performance of the twisted conductor pair, or to enhance the kink-resistance of the electrical transmission line cable, or to reduce the overall weight of the cable per unit length. For example, a longer lay length will reduce the overall amount of copper wire per unit length of electrical transmission line cable.

Some embodiments of the transmission line cable involve a hollow monofilament line with conductors embedded in the monofilament. The conductors in the monofilament can be paired with high strength yarns and/or smaller, solid monofilaments located within the hollow monofilament's cavity to provide mechanical strength and prevent stretching and breakage of the conductors. The embedded conductors and the yarns and/or monofilaments together form a balanced electrical transmission line. Alternately, the conductors can follow a helical profile within the wall of the hollow monofilament to produce a twisted pair and enjoy the EMI and EMC benefits that a twisted pair provides. An overbraid may be added as discussed above to further strengthen the line and withstand tensile stress and resist stretching.

Some embodiments of the transmission line cable involve a solid monofilament line with conductors embedded in the monofilament. The conductors together with the monofilament material between the conductors form a balanced electrical transmission line. These conductors may or may not follow a helical profile, i.e., it may be a parallel pair transmission line or a twisted pair transmission line. An overbraid may be added as discussed above to further strengthen the line and withstand tensile stress and resist stretching.

The cable designs outlined above may be well suited to any applications requiring a small, strong, and lightweight electrical transmission line cable, for example tethered aerial vehicles or tethered underwater vehicles. The use of textile yarns as dielectric and strength member is a valuable approach that allows for the construction of electrical transmission line cables that are small, lightweight, and strong.

Video Fishing System

Figure 4:
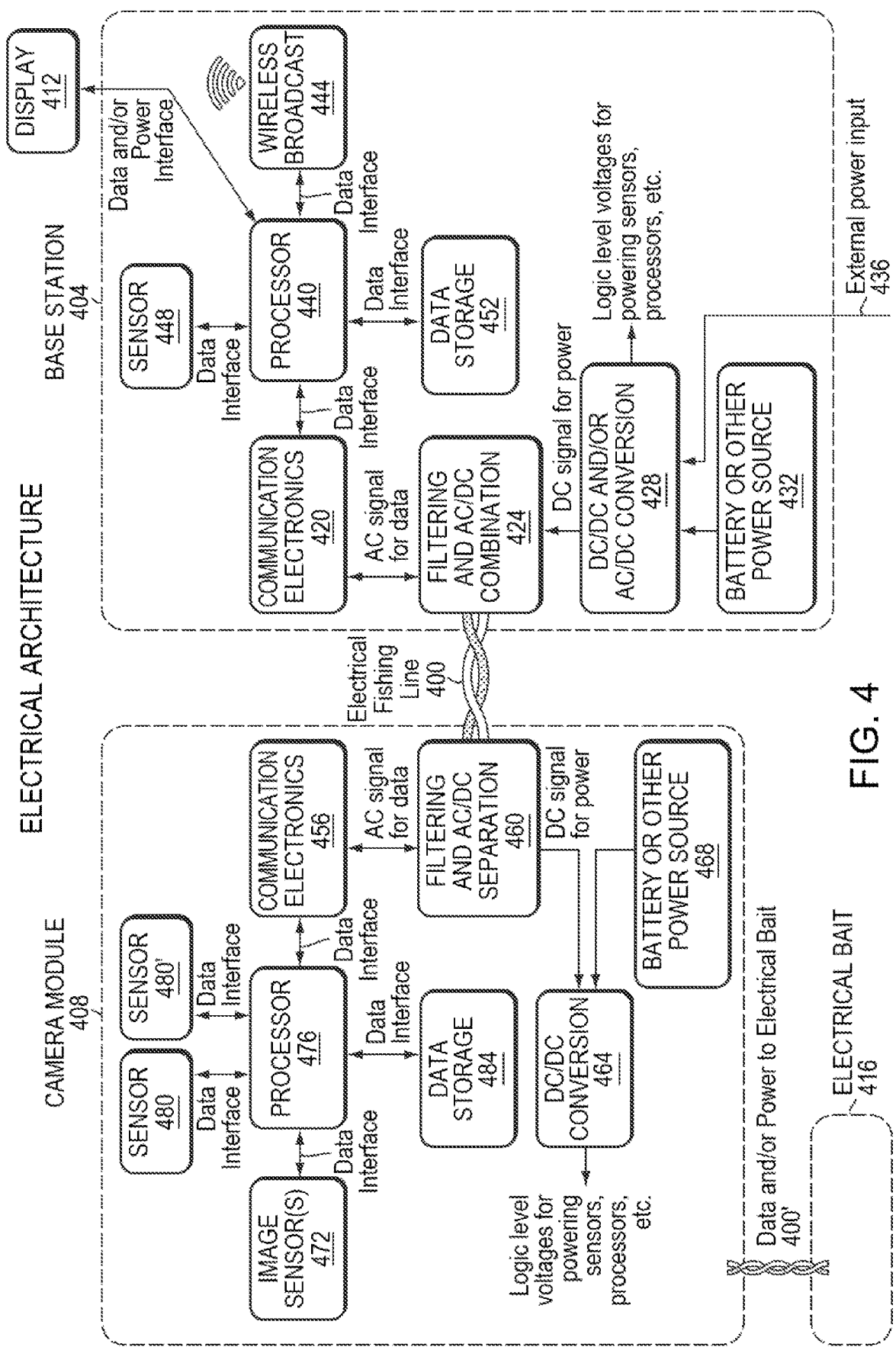
FIG. 4 depicts a system-level block diagram of the electrical architecture used in a video fishing system in accord with still another embodiment.

FIG. 4 depicts a system-level block diagram of the electrical architecture used in a video fishing system in accord with still another embodiment.

There are four main components that make up the electrical architecture of the video fishing system: the base station 404, the camera module 408, the display 412, and the optional electrical bait 416. The base station 404 and the camera module 408 are connected by the electrical fishing line 400.

The base station 404 contains communication electronics 420 for sending data to and from the camera module 408 over the electrical fishing line 400. To facilitate sending power over the electrical fishing line 400, most likely but not necessarily over the same two conductors used for data transfer, the base station 404 may contain filtering components and other circuit components 424 to combine the DC power signal with the AC data signal. The DC power signal is generated by a step-up voltage converter 428. This step-up converter 428 may contain other voltage step-up converters, step-down converters, or step-up/step-down converters as necessary to provide the voltage levels required by other components within the base station 404 and/or the display 412. The power input into the voltage converter may be DC, for example from an optionally included battery or another DC voltage source 432, or AC, for example from mains wiring 436. The step-up converter 428 used for transmitting power over the electrical fishing line 400 may include a capacitance multiplier to reduce output ripple that might interfere with the communication signal while limiting the amount of capacitance attached to the high voltage bus for safety reasons. It may also include output current limiting circuitry for safety reasons (not shown). The communication electronics 420 in the base station 404 facilitate data transfer over the electrical fishing line. This data may be sent onwards to a processor 440 within the base station 404 for additional processing and/or to a display 412 and/or to a wireless broadcasting apparatus 444. Additional sensors 448 (e.g., outdoor air temperature sensor, ambient light, geographic location) may connect to the base station processor 440 to capture useful information to provide to the angler. Data may also be sent to a data storage device 452 to store in memory for future access (e.g., to watch or download the video in the future). The base station 404 may also contain a microphone (not shown) for capturing audio. The base station 404 may also contain a GPS sensor to determine location. The base station 404 may also contain an energy harvesting system (not shown) that can harvest energy from the spinning motion of the reel (i.e., an electric generator) in order to power the system or recharge the system's battery 432.

A waterproof and depth tolerant camera module 408 is located at the distal end of the electrical fishing line. The electrical fishing line 400 serves as both the angler's fishing line and an electrical conduit that is used for transferring data from the camera module 408 to the base station module 404 (which is located near the angler) and vice versa, and for sending power from the base station module 404 to the camera module 408. The angler is able to send commands, either from physical controls on the fishing rod or reel, or from wirelessly linked controls, to the camera module 408 as desired to control various functionalities of the camera module e.g., activating lights for the illumination of subject matter.

In some embodiments, the camera module 408 is an omnidirectional camera that uses multiple lenses and image stitching to provide a field of view that covers approximately an entire sphere or at least a full circle in the horizontal plane.

One exemplary embodiment includes an orientation and/or motion sensor (not shown) in the camera module 408 to identify the orientation of the camera with respect to a reference frame, for example the inertial (Earth) frame. The orientation and/or motion sensor may be an inertial measurement unit, an accelerometer, a gyroscope, a magnetometer, a combination thereof, etc.

With orientation data and motion data, the image from the camera module 408 may be stabilized against motion or displacement and advanced applications like video stabilization may be enabled. In particular, orientation and/or motion data may be used to eliminate video shake and jitter, for example through the process of dynamic cropping or dynamic zooming. In these techniques, only a portion of the entire image captured by the sensor is displayed to the viewer. The cropping or zooming parameters are determined in part using the data from the orientation and/or motion sensor. This method allows for a more stable image to be presented to the viewer despite camera motion at the cost of reducing the viewer's field of view. Note that in an omnidirectional camera embodiment, field of view may not have to be reduced when applying this stabilization method. In addition to shake and jitter, orientation and motion data can be used to maintain a general orientation lock for an image from a camera module 408, for example to provide a horizon lock, whereby the image from the camera module 408 stays level with respect to the horizon despite the module's motion; or to lock the image with respect to magnetic north and counter z-axis spin of the camera module 408. Horizon lock could be beneficial for fishing methods in which the camera is primarily in a horizontal attitude e.g., cast and retrieve. Magnetic north lock could be beneficial for fishing methods in which the camera is primarily in a vertical attitude e.g., bottom fishing. In some embodiments, image data from the camera module 408 itself may be used to enable stabilization features.

In some embodiments, an orientation and/or motion sensor may be located in the fishing rod, and the orientation of the rod may be used to control the orientation of the image from the camera module 408. For clarity, moving the rod may not move the camera module 408, but may instead change the amount of rotation of the image from the camera module 408. In this setup, an orientation lock would exist between the rod and the camera module, so that as the angler rotates the rod about the gravitational vector, the image they see from the camera module rotates in relation to the rod rotation.

The camera module 408 contains communication electronics 456 for sending data to and from the base station 404 over the electrical fishing line 400. To facilitate receiving power over the electrical fishing line 400, most likely but not necessarily over the same two conductors used for data transfer, the camera module 408 may contain filtering components and other circuit components 460 to separate the DC power signal from the AC data signal. The DC power signal connects to the input of a voltage step-down converter 464. The DC power signal may pass through one or more diodes, or a full bridge rectifier, that are included to prevent the input capacitance of the step-down converter from discharging into the electrical fishing line 400, for safety reasons. The step-down converter 464 may contain other step-down converters, step-up converters, or step-up/step-down converters as necessary to provide the voltage levels required by other components within the camera module and/or the electrical bait. The camera module 408 may contain a battery or other power source 468 to provide some or all of the power to the components within the camera module 408 and/or electrical bait 416. It may also contain an additional energy storage device (not shown) used to provide burst power to electrical components that may require temporary large power spikes e.g., motors for actuating fins. The camera module 408 contains one or more image sensors 472 and may contain LEDs or other light generating devices for the illumination of the subject matter. The camera module 408 also includes a processor 476 that receives data from and sends data to the image sensor(s) 472. The processor 476 may perform image and/or video encoding to reduce the size of this data to facilitate transmission across the electrical fishing line 400. Additional sensors 480, 480' may be included in the camera module 408 to collect various data of interest, e.g., water temperature, water depth, water salinity, ambient light, to provide to the angler. These sensors 480, 480' may send data to and receive data from the camera module processor 476 and may be used to adjust the image sensors 472 and/or image processing settings to improve image quality. The camera module 408 may also contain a data storage device 484 for storing sensor or video or photographic data. The camera module 408 may also contain a microphone and/or hydrophone for capturing audio (not shown).

A wired electrical approach can achieve the necessary data rate (assuming video compression within the camera module 408) over the distances used in typical fishing setups, with the added benefit that power can also be sent over the line at high efficiencies, obviating the need for a battery within the camera module 408. Without a battery, the camera module itself can be exceptionally small and lightweight (ideally near or exactly neutrally buoyant, or with adjustable buoyancy to meet the needs of different fishing techniques), roughly the size of a tube of lipstick. The camera should be small and lightweight enough that it does not have a detrimental or noticeable effect on the fishing experience (especially if the angler is casting the camera module out into the water) and achieving this is possible if a battery is not required inside the camera module. Additionally, the same conductors used for transferring data can also be used to transfer power, which helps to achieve a smaller size electrical fishing line by keeping conductor count to a minimum. The size and weight of the line affect castability and usability when fishing. A wired electrical approach is one way to achieve the overarching goal of creating a video fishing system that provides the angler with a nearly identical experience to traditional angling. Accordingly, embodiments use an electrical fishing line: a single cable that acts as fishing line, communications link, and power supply conduit.

Optionally, an electrical bait 416 may connect to the camera module 408 through an additional length of electrical fishing line 400', which may or may not include connectors or other apparatus for ease of detachment and attachment. This electrical bait 416 may contain image sensors, other sensors, processors, or other components to facilitate data collection and/or functionalities of use within the electrical bait, e.g., illumination or vibration for attracting fish, illumination of subject matter, motors or other actuators to imitate the movements of a living bait, etc. The electrical bait may also contain a microphone or hydrophone for capturing audio.

In some embodiments, the camera module 408 and bait/lure 416 are combined into a single "camera lure" apparatus. The camera lure combines the functionality of the camera module (video capture, data capture, omnidirectional field of view, etc.) and the lure (patterns and/or colors to entice fish strikes, hooks for retaining the fish on the lure after the strike, etc.).

The display 412 connected to the base station module 404 allows for real-time or after-the-fact viewing of the video and other data from the camera module 408 and/or electrical bait 416 for informational and/or entertainment purposes. The display 412 may be mounted on the fishing rod or located elsewhere, permitting anglers and/or other observers (either locally or remote, for example on a live streaming platform on the web). The display 412 may connect to the base station 404 through a wire to facilitate the video and/or power connection, or it may be wireless. The display 412 may take the form of a dedicated monitor or a user's personal device e.g., phone, tablet, laptop.

The video fishing system may also include a functionality to perform diagnostic tests to assess the state of health of the electrical fishing line. These cable diagnostic tests may use time domain reflectometry or similar techniques to locate faults within the electrical fishing line. This diagnostic information may be communicated to the user of the video fishing system in order to provide troubleshooting feedback or to advise of an impending cable electrical failure or estimated time to electrical failure.

Additionally, the video fishing system may include voltage and current measurements within the camera module and/or base station so that the DC resistance of the conductors within the electrical fishing line can be measured. Measuring the DC resistance of the conductors allows for an accurate estimation of the length of fishing line connected between the base station and the camera module, which is valuable information to provide to the angler.

Such a system may also be useful for activities other than fishing e.g., exploration of the underwater environment, marine research, inspection of underwater equipment, reconnaissance, etc.

Electrical Fishing Line

Some prior art approaches teach the use of a "downrigger" line as being fabricated from or containing a current carrying conductor or pair of conductors, together with a material intended to provide tensile strength to the line. However, a downrigger is a truly separate line normally used for placing a lure at a desired depth when trolling and, due to its size, weight, stiffness and configuration, i.e., typically connected to a large, heavy weight, it is not a fishing line and is unsuited to serve as a fishing line. Downrigger lines are connected to the fishing line with a clamping mechanism that, when a fish strikes the bait and the fishing line lightly shakes, releases and disconnects the downrigger line from the fishing line to facilitate the retrieval of the fish.

These prior art approaches are typically configured to deliver electrical power and/or DC signals and not transmit data-carrying AC signals and therefore lack features that are either desirable or necessary for carrying electromagnetic waves encoding data over a transmission line, such as uniform cross-sectional dimensions along their length, uniform spacing between conductors, uniform dielectric properties of a spacing material, and/or a uniform impedance. The distinction is apparent when the prior art load is, e.g., a DC device instead of a data source or data sink.

By contrast, embodiments of the present invention provide an electrical transmission line cable deployed as an electrical fishing line in a video fishing system (e.g., 400 in FIG. 4) that allows the angler to observe their bait (either live or artificial) and/or the underwater environment in real time.

To closely mimic conventional fishing line, the electrical fishing line is similar as possible to conventional lines in terms of buoyancy, size, breaking force, strength, abrasion resistance, hygroscopicity, hydrophobia, UV resistance, flexibility, flex life, elastic modulus, chemical resistance, fungal resistance, and other properties. Typical monofilament, fluorocarbon, and braided fishing lines have a specific gravity in the range of 0.97-2.0, so the electrical fishing line's buoyancy should be within this range. One goal for the electrical fishing line is to make it as similar as possible to conventional fishing line so that it can be used in the same manner for various styles of fishing, e.g., cast and retrieve, vertical jigging, trolling, bottom fishing, surf casting, fly fishing, etc. Denser fishing lines will have a higher sink rate which is problematic for some styles of fishing, so keeping specific gravity below approximately 2.5 can be important for usability. Note that when practicing the fishing technique known as "trolling" it may be desirable to have a very dense fishing line, which is commonly made with a lead core or another core material with a very high density. The motivation for using a high-density fishing line is to provide sufficient sinking force to keep the bait suspended well below the water surface as the line and bait are pulled through the water while trolling. To make an electrical fishing line with a high density one could use larger conductors or conductors made from a denser metal. While the denser metals might have a lower conductivity than copper, the increased size would likely more than offset the increased resistivity so that the electrical performance of the line would be sufficient.

Note that some types of fly-fishing line are typically designed to float on water (specific gravity less than 1) and typically have larger diameters than other fishing line types. It is possible to create a floating electrical fishing line using the same design techniques used to make a fly line positively buoyant. This can be achieved by surrounding the core of the line with a low-density material, for example a foamed polymer.

The electrical fishing line may have any length but will typically have a length of 50 to 500 meters, as most conventional fishing setups have line lengths in this range. Transmission of encoded digital video of acceptable quality typically requires a data rate of at least 1 Mbps for 1080p resolution at 30 frames per second, with higher data rates allowing for increased resolutions, frame rates, and image quality. To achieve these data rates over a wired medium requires the use of the electromagnetic spectrum up to at least several hundred kHz to a few MHz. Since the data will be communicated using signaling in at least the high kHz to low MHz range, we know that the electrical fishing line will be acting as a transmission line due to its length, since wires begin to exhibit transmission line behavior near ½0th of the wavelength of the frequency of the signal. Assuming a 500 kHz signal frequency, the wavelength is 600 meters, so ½0th of the wavelength is 30 meters, meaning that if the wire is longer than 30 meters in length, it should be modeled as a transmission line.

Figure 5:
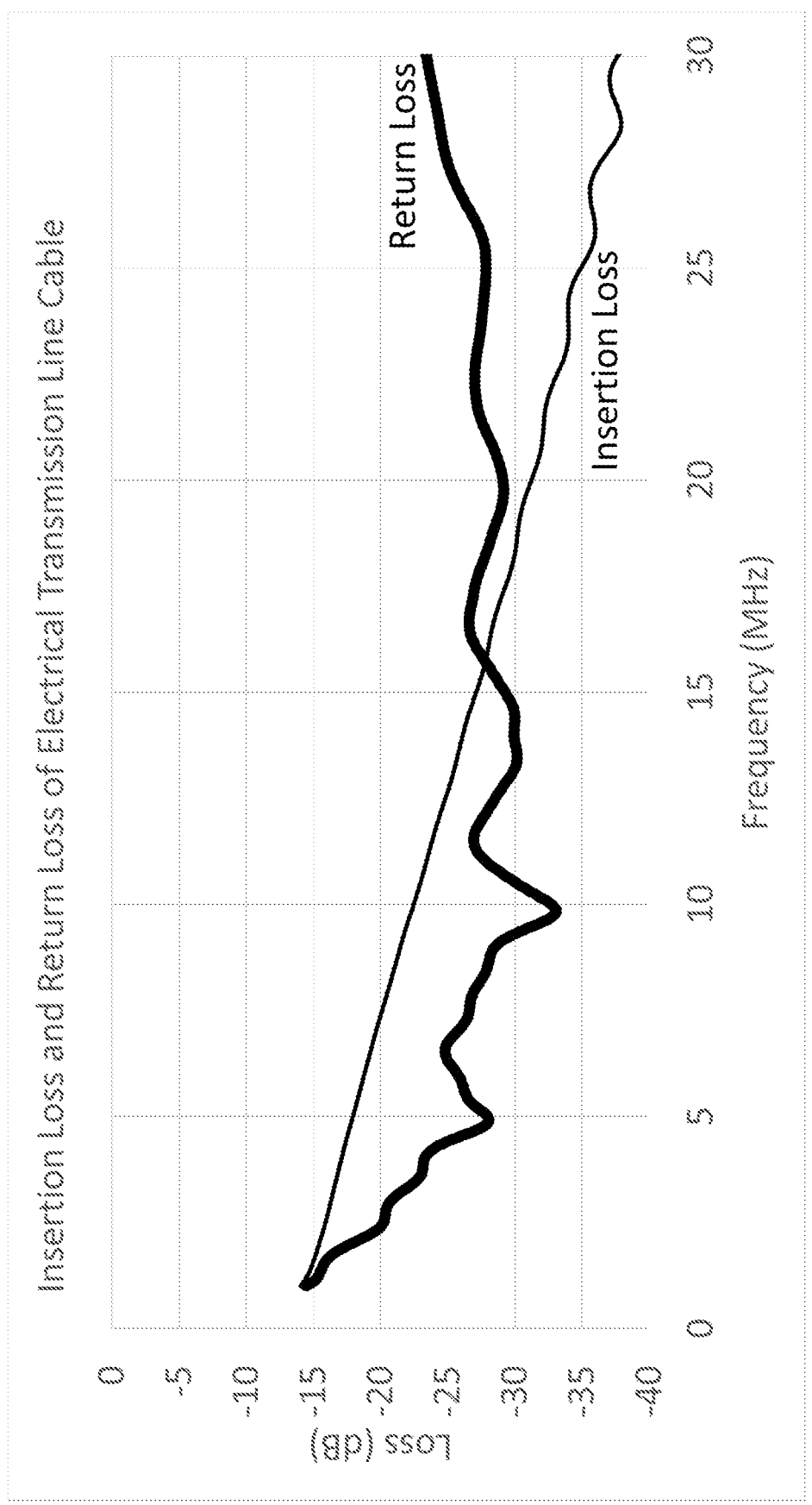
FIG. 5 depicts insertion loss and return loss data for one embodiment of the present invention.

At the time of writing, several iterations of electrical transmission line cables employing the design architecture shown in FIG. 3 have been successfully manufactured and used in video fishing systems. Insertion loss and return loss data, measured with an S5085 vector network analyzer (VNA) from Copper Mountain Technologies together with a pair of ADT2-1T+ baluns from Mini-Circuits, for a 75-meter length of one such cable is shown in FIG. 5. This cable contains two 39 AWG magnet wires (39SNSP from Remington Industries, single build with solderable polyurethane insulation conforming to the NEMA MW-79 C specification) and seven 100 denier Vectran yarns from Kuraray. The two 39 AWG magnet wires and six of the 100 denier yarns are twisted helically about a single central 100 denier yarn in an "8-around-1" configuration to form a balanced unshielded twisted pair transmission line in which the central yarn is acting as the transmission line's dielectric element. The two conductors are positioned nominally 180 degrees apart from one another. The cable core is surrounded by an ETFE jacket with a wall thickness of or 0.13 mm, resulting in an overall cable diameter of approximately 0.5 mm. As can be seen from the data in FIG. 5, in particular the return loss data, we have succeeded in creating a high-performance electrical transmission line. In the band of 1.5 MHz-2.5 MHz the return loss is better than −15 dB. In the band of 2.5-30 MHz the return loss is better than −20 dB. Both of these metrics indicate very good transmission line performance. This cable has a nominal breaking load of 30 pounds and has been successfully integrated into a complete and working video fishing prototype system employing the architecture shown in FIG. 4. A 10Base-T1L link is used for transferring video data across the electrical transmission line cable which has a length of 75 meters, and power is sent across the same two conductors at a voltage and current of approximately 240 V DC and 6 mA DC. The system has demonstrated maintaining successful data and power transmission functionality while under loads of up to 20 pounds. The author has successfully observed and caught many fishes of different species in both saltwater and freshwater environments, at depths up to and greater than 100 feet, and has thoroughly enjoyed the experience.

The electrical fishing line is a replacement for conventional fishing line. It is wound onto the spool of the fishing reel in the same way a typical fishing line is. The proximal end of the electrical fishing line connects to the fishing reel, and the fishing reel is electrically connected to the base station module. The base station module is located either on or near to the fishing rod or may be entirely integrated into the fishing rod or reel. The distal end of the electrical fishing line connects to the camera module.

There may be a connector at the distal end of the electrical fishing line to allow for disconnection of the camera module from the line, so as to make it easier to assemble or disassemble the video fishing system or to change the electrical fishing line as needed. There may also be a connector at the proximal end of the electrical fishing line to allow for disconnection of the electrical fishing line from the fishing reel, so as to make it easier to assemble or disassemble the video fishing system or to change the electrical fishing line as needed. These connectors make the electrical connection to allow for the transfer of data and power and also form a mechanical connection to allow for the transfer of force along the electrical fishing line. The connector at the distal end of the electrical fishing line mates either directly to the camera module or to a short pigtail of electrical fishing line that is permanently attached to the camera module. The connector at the proximal end of the electrical fishing line mates either directly to the fishing reel or to a short pigtail of electrical fishing line that is permanently attached to the fishing reel.

If there is a pigtail of electrical fishing line coming off of the camera module, it may be advantageous to armor this section of line to protect it from potential fish bites or other sources of damage.

Alternatively, the electrical fishing line may terminate inside of the camera module housing, both mechanically and electrically. In this approach, the electrical fishing line enters the camera module housing in a sealed manner to prevent the ingress of water into the camera module, for example through the use of O-rings around the outer jacket of the line. The strength member of the electrical fishing line is then anchored to the camera module housing in some way. e.g., knot tying, crimping. etc., to allow for the transfer of force from the camera module to the fishing line. The conductors inside the electrical fishing line are then connected to the camera module to form the electrical connection. This process of sealing, anchoring, and connecting the electrical fishing line to and inside of the camera module may be executed by the end users of the video fishing system either in the field or at home. The end user may wish to cut off a length of damaged electrical fishing line and re-terminate the remaining, undamaged length of line to the camera module, for example. A similar approach may be used for the connection of the electrical fishing line to the base station.

Extending from the distal end of the camera module is another line, either typical fishing line or electrical fishing line, that terminates at the bait. If this terminal line (called a "leader line" in the fishing vernacular) is electrical fishing line, power and/or data may be communicated across it from the camera module to an electrical bait or vice versa in order to allow for various electrical and/or mechanical functions within the electrical bait (e.g., bait illumination or flashing, or bait mechanical vibration or motion) to be activated. Such electrical bait functions might be activated by the angler in order to increase the likelihood of a fish striking the electrical bait.

To reduce the risk of camera module loss in the event of a line break, the leader line can be weaker than the electrical fishing line. With this setup, if the bait is snagged or the hooked fish is strong and/or large enough to break the leader line, the leader line will fail before the electrical fishing line. The bait will be lost but the camera module will be recovered.

The electrical fishing line may also be assembled from multiple shorter lengths of electrical fishing line with connectors on each end. These connectors are small enough that they can be spooled onto the fishing reel without a significant or detrimental impact to the user experience. The advantage of forming a longer electrical fishing line from a plurality of shorter electrical fishing lines in this manner is that in the event of line failure, the entire line would not have to be replaced. Rather, one would simply replace the segment of the electrical fishing line that failed. This setup would be particularly advantageous for any fishing technique that used especially long fishing lines, for example 400 meters or more. In such a setup, one might assemble a single 400-meter electrical fishing line by connecting together, in series, four separate 100 meter electrical fishing lines.

Inline Slip Ring

It is well understood that some baits will spin about the long axis of the fishing line as they are moved through the water, either intentionally to attract fish or unintentionally. Without the presence of a swivel or other component designed to allow for rotation, this can lead to a common phenomenon known as line twist, in which the fishing line is twisted about its long axis. Line twist can permanently deform, damage, or destroy the line. To prevent this problem, a swivel element is typically placed in line with the fishing line, usually between the main line and the leader line or directly between the bait and the line.

One approach for providing the same line twist compensation mechanism for electrical fishing line involves an inline electrical slip ring. The slip ring maintains electrical contact between the two conductors on either side of the slip ring even while one side of the slip ring rotates relative to the other. The slip ring may be located at or within the connector between the camera module and the distal end of the electrical fishing line or may be located on the pigtail coming off the camera module or may be integrated into the camera module itself. The slip ring may also be located anywhere along the electrical fishing line. The slip ring (or an additional slip ring) may also be located between the camera module and an electrical bait, if such an electrical bait is used. The slip ring is designed to be waterproof and neutrally or close to neutrally buoyant so as not to have a negative impact on fishing technique or bait presentation.

Fishing Reel Slip Ring

Because most fishing reels are designed such that the fishing line rotates relative to the angler, an electrical slip ring is most likely necessary in the fishing reel. The "spinning" reel (also called a "fixed spool" reel) has a spool which rotates about an axis parallel to the long axis of the fishing rod under "drag" conditions i.e., when line is being pulled off the reel by a fish so as to keep the line from breaking. The "baitcasting" reel has a spool which rotates about an axis perpendicular to the long axis of the fishing rod under normal conditions i.e., when casting or retrieving. The electrical slip ring allows for the rotation of the spool while maintaining electrical continuity between the base station, which is most likely fixed relative to the rotating reel. The electrical slip ring is most likely integrated into the reel itself. The electrical slip ring has two or more conductors. It may be electrically located such that it passes AC communication signals, DC power signals, or both signals.

Camera Module

The camera module is located at the distal end of the electrical fishing line and provides the user with a real time view of the underwater environment. It is designed to have as little impact as possible on the angling experience so that the video fishing user experience is as similar as possible to conventional angling. To achieve this, the camera module is made as small as possible and with neutral or near neutral buoyancy. Reducing the size of the camera module reduces the drag force it generates when being pulled through the water. Trimming the camera module to neutral buoyancy ensures that it does not impart positive or negative lift on the bait so that the bait moves through the water in the same way that it does when the camera is not present. The camera module may also include stabilizing fins to ensure dynamic stability as the camera module is pulled through the water. These stabilizing fins may be adjustable so that the angler can best trim the camera to improve swim dynamics for their current fishing technique, bait, or environmental conditions. The angle of attack of these fins may be passively user adjustable or actively user adjustable through an electrical actuation mechanism. Though the camera module is primarily designed for dynamic fishing techniques in which the bait is pulled through the water (e.g., cast and retrieve, trolling), it is also well suited to static techniques in which the bait and camera are stationary (e.g., bobber fishing, bottom fishing). Additionally, the camera is designed to have a streamlined shape so that it is unlikely to become snagged on underwater structure such as rocks or submerged trees or other structure. The camera module shape is also designed to have low hydrodynamic drag.

The components within the camera module are likely positioned in such a way as to give the camera module a center of gravity that is below its center of buoyancy. With this feature, the camera module will be naturally self-righting in water and will tend to stay upright so that the captured video is upright. This is the same principle employed by submarines to keep them upright when submerged. Additional ballast may be included within or below the camera module to further enhance this characteristic. Additionally, the printed circuit boards (PCBs) located within the camera module may be designed so as to encourage it to have a low center of gravity. For example, the densest components (e.g., inductors) on the circuit board could be located on the bottom of the board so that they sit low within the camera module.

The camera module contains some or all of the following electrical components: one or more image sensors, a host processor capable of image signal processing and video and image encoding, communication electronics, power receiving electronics, reverse discharge protection diodes, and additional sensors. It may also contain electronics for illumination of the bait and/or underwater environment such as visible light LEDs or infrared LEDs. It may also contain one or more IR cut filters. It may also contain a lens for each image sensor. It may also contain a battery or other energy storage device, though this will impact the feasibility of achieving a neutrally buoyant and small camera module. The battery or energy storage device may be a small device whose purpose is not to power the entire camera module 100% of the time, but to provide for burst power requirements when necessary. An example of an architecture that would include a burst power requirement is electrical actuation used to adjust fin angle of attack when commanded by the angler. Another example is a user triggered bait illumination functionality. Due to their high power density, a supercapacitor could be a good choice for an energy storage device whose purpose is to provide burst power on occasion. The burst power energy storage device would be regularly recharged using excess power available from the power sent over the conductors so that these commanded functionalities can be triggered as needed.

The camera module includes a primary port to which the electrical fishing line is connected. Alternatively, the port for the primary electrical fishing line may be a connector at the end of a short pigtail that is attached to the camera module. The primary port can allow for some or all of the following functions: mechanical attachment and/or anchoring of the electrical fishing line to the camera module so that force may be transferred from the camera module to the line, electrical connection so that data and/or power may be transmitted between the camera module and the line, and sealing so as to prevent the ingress of water into the camera module and/or into the line. In some embodiments, the primary port is used for sealing to prevent the ingress of water into the camera module and/or electrical fishing line, and the mechanical anchoring and electrical connection are located inside the camera module.

The camera module may also have a secondary electrical port or secondary pigtail to which a leader length of additional electrical fishing line connects. This secondary port allows for the connection of baits with electrically powered features and communications, as described earlier. The secondary port serves to mechanically and electrically connect the bait to the camera module to allow for the transfer of force, communications, and power.

The camera module housing provides protection to the components internal to the camera module from the surrounding water and depth pressure. It also protects the internal components from fish strikes or other impacts that it may be subject to during use.

The electronics and sensors within the camera module housing are in an approximately 1 atmosphere pressure environment i.e., the camera module housing acts as a pressure vessel. Alternatively, the camera module may employ a flooded design in which water fills some or all of the unoccupied space within the camera module and the electronics and sensors are coated or potted or protected in some other way from the water.

The camera module may contain a mechanism for adjusting the buoyancy of the camera module so that it can be trimmed to optimize use for the angler's fishing technique, bait, and environmental conditions. For example, the camera might be trimmed heavy in order to encourage the camera and bait to sink in the water, or trimmed light to encourage the camera and bait to rise or float in the water. The buoyancy might also be adjusted in accordance with the density of the water being fished, for example salt water imparts a larger buoyant force on submerged objects than fresh water does, due to the higher density of salt water.

The camera module may contain additional sensors that collect data about environmental conditions. This data can be provided to the angler for informational and educational and entertainment purposes. Additionally, this data can be used by the image signal processing of the camera module host processor to improve and/or tune the image quality. The following sensors, and others, may be included in the camera module: depth or pressure sensor, water temperature sensor, water submergence sensor, salinity sensor, water velocity sensor, ambient light sensor, infrared sensor, force sensor, mechanical strain sensor, accelerometer, gyroscope, Global Positioning System (GPS) sensor, internal temperature sensor, microphone, and hydrophone. Alternative embodiments may include depth sounding and/or sonar capabilities within the camera module.

The image and sensor data captured by the camera module may also be integrated, using sensor fusion techniques, with sonar or other data that is captured from separate systems e.g., data from a sonar system mounted to a boat.

The camera module may contain more than one image sensor. For example, it may contain a front-facing image sensor and a rear-facing image sensor so that both the bait and the boat and/or angler(s) can be viewed and/or recorded simultaneously. Alternatively, it may contain multiple image sensors that are arranged circumferentially to allow for a 360-degree view image to be produced by means of image stitching. Alternatively, some lenses may face downwards or upwards to provide these views which may be beneficial for certain fishing techniques such as vertical jigging.

Sending Data Over Electrical Fishing Line

Due to the ever-increasing resolutions and frame rates of digital video, the amount of raw data generated by digital video systems is large. For example, a 1920×1080 pixel video stream (otherwise known as Full High Definition or FHD resolution) at 30 frames per second (fps) with a typical color depth of 24 bits generates almost 1.5 gigabits per second (Gbps) of data. If the resolution is increased to 3840×2160 pixels (also known as 4K resolution), the data rate increases to almost 6 Gbps. Transferring such high data rates over wired media is power intensive, costly, and requires using cables with low insertion loss at high frequencies. 10GBASE-T, an Ethernet standard that is rated to up to 10 Gbps, requires the use of Category 6 cabling which contains four twisted pairs each rated to no more than 31.1 dB of insertion loss at 250 MHz. To meet that insertion loss specification requires the use of at least 24 AWG copper conductors at a maximum cable length of 55 meters. Due to its large size (about 5 mm diameter), it is obvious that using a Category 6 Ethernet cable as fishing line is not feasible. For reference, 25 lb. test monofilament is about 0.5 mm in diameter. Since the aim is to make the electrical fishing line as similar in diameter as possible to conventional fishing line, it is clear that data rates in the Gbps range are not feasible and that video compression (also called video encoding) is required.

There are many video encoding standards in use, for example Advanced Video Coding (AVC or H.264) and High Efficiency Video Coding (HEVC or H.265). These technologies use compression techniques to significantly reduce the data rate of digital video. For example, a 1080p video using H.264 encoding could have a data rate in the range of 1-5 Mbps while still achieving excellent image quality. Using H.265, it is possible to encode a 4K 60 fps video to while still achieving excellent image quality.

It is well understood that in an electrical transmission line, a relationship exists between signal frequency and attenuation. Specifically, higher frequencies (which allow for higher data rates) are attenuated more harshly than lower frequencies which reduces the achievable transmission distance. Additionally, the use of smaller conductors (which is desirable to keep the overall electrical fishing line small and lightweight) results in higher attenuation than that of larger conductors. For a video fishing system, a reasonable requirement for transmission data rate and distance is 10 Mbps and 100 meters. We would also like to keep the electrical fishing line as small as possible, for example the 40 AWG twisted pair UHMWPE presented earlier, with an outer diameter of 0.50 mm and a breaking force of 30 lbf. At the time of writing, there are two technologies that are capable of achieving this goal: 10Base-T1L single pair Ethernet, and powerline modems utilizing orthogonal frequency division multiplexing (OFDM).

10Base-T1L establishes a full-duplex communication link over a single pair of conductors with a bidirectional and simultaneous data rate of up to 10 Mbps. The transmission distance of 10Base-T1L is 1000 meters or more using 18 AWG cabling. However, if smaller conductors are used, this transmission distance will be reduced, as noted previously. The 10Base-T1L standard specifies an insertion loss limit for the 2.4 Vpp operation mode defined by:

$$\text{Insertion loss } (f) \leq 10\left(1.23 \times \sqrt{f} + 0.01 \times f + \frac{0.2}{\sqrt{f}}\right) + 10 \times 0.02 \times \sqrt{f} \text{(db)}$$

where $f$ is the frequency in MHz; $0.1 \leq f \leq 20$

This insertion loss limit can be used to predict the maximum length of an electrical fishing line that can establish a 10Base-T1L link, for a given insertion loss per unit length in the frequency band of interest. For the 40 AWG example electrical fishing line, a cable length of 135 meters approaches but stays within this insertion loss limit. Adjusting conductor size, spacing, and dielectric material properties has in impact on insertion loss and therefore maximum achievable transmission distance. Scaling things up in size, for example, would result in an electrical fishing line design with increased breaking strength, increased diameter, and an increased maximum allowable length to achieve a 10Base-T1L link. In other words, a larger, stronger fishing line could achieve a greater transmission distance. By scaling the design this way, electrical fishing lines of different strengths, lengths, and sizes can be created to address the needs of different fishing techniques. At the time of writing, the establishment of a 10Base-T1L link over the 40 AWG example design presented here has been successfully tested and demonstrated with a cable length of 75 meters, using newly released 10Base-T1L integrated circuits from well-known silicon producers. As 100Base-T1L and other high-speed, long-distance Ethernet products become available, these may also be a good choice for data transfer.

An alternative approach to 10Base-T1L, which uses baseband signaling, is to use powerline modems employing OFDM, which is a broadband signaling approach that utilizes more of the available spectrum. Powerline modems are a communications technology that uses the electrical power supply lines within homes, offices, or other settings as the medium to transmit high throughput data. OFDM divides the available spectrum into many sub-carriers allowing for increased spectral efficiency over baseband signaling techniques. For a given spectrum bandwidth, insertion loss, and noise profile, powerline modems may offer higher data rates than 10Base-T1L. Data rates greater than 10 Mbps could be useful for extremely high resolutions, frame rates, or stitched videos formed from the inputs of multiple image sensors. However, at the time of writing, available powerline modem devices require significantly more power than do 10Base-T1L devices, making them a less attractive option for video fishing systems with remotely powered camera modules. Since the power is being supplied to the camera module over high resistance conductors, reducing power draw within the camera module is important. For example, a typical powerline modem consumes 2-3 W of power, whereas a 10Base-T1L PHY or MAC+ PHY consumes less than 130 mW of power. Reducing the power draw in the camera module allows for the use of higher resistance conductors, which enables electrical fishing lines with small diameter, long lengths, or both.

While the majority of the data will be transferred from the camera module to the base station, a bidirectional communication link is valuable. In particular, it allows for the remote programming or re-programming of the firmware within the camera module processor(s), as well as allowing for the angler to issue commands to activate certain functionalities within the camera module e.g., illumination lighting, vibration.

Sending Power Over Electrical Fishing Line

As discussed earlier, sending power over the conductors of the electrical fishing line obviates the need for a battery or other energy source located inside the camera module which dramatically reduces its size and weight. By sending DC power over the same pair of conductors that carry the AC signal to transmit data, the total number of conductors inside the electrical fishing line can be reduced to a single pair, which allows for the construction of a smaller and lighter weight electrical fishing line that is very similar to conventional fishing line. However, the use of small conductors presents a high DC resistance over which the power must be transmitted which presents a challenge. Additionally, when the electrical fishing line is wound on the spool of the reel it is more susceptible to overheating due to an effective increase in thermal resistance in this configuration. Put another way, the heat generated in the inner windings of the spooled electrical fishing line (which are in essence buried underneath the successive outer windings) must be conducted through the insulation material which typically has poor thermal conductivity.

The solution to both challenges is to reduce Ohmic power loss in the conductors by transmitting the DC power at high voltage and low current, as well as reducing the power draw of the camera module so that less power must be transmitted over the electrical fishing line. At the time of writing, a good estimate for the power required by the camera module is 1 W, which is consumed by the three main components: image sensor, video processor, and communications electronics.

A common example of a technology that sends DC power over the same conductors used for AC signal transmission is Power over Ethernet (PoE). For safety reasons, the voltage of PoE systems is limited to 60 V or less so that they do not present an electrical shock hazard to humans and can be classified as ES1 by the governing standard, IEC 62368-1. It is well understood that the power which can be delivered to a load through a resistor is defined by $V^2/4R$, where V is the source voltage and R is the resistance of the conductor. For a 100-meter length of the 40 AWG electrical fishing line design presented above, the total round-trip resistance is 688 Ohms, which would allow for a maximum power delivery of 1.3 W to the load. To deliver this amount of power would require a DC current of 43 mA.

However, given the thermal limitations presented earlier, a current of 43 mA in the electrical fishing line will generate far too much heat and produce temperatures within and on the outer insulation of the line that are too high for product safety and reliability. For magnet wire, a common technique used to estimate maximum permissible current is using the metric of current density. For transformers wound using magnet wire, a common upper limit used is 2.5 $A/mm^2$, which for 40AWG wire translates to 25 mA. However, the electrical fishing line will have lower thermal conductivity than pure wound magnet wire due to the addition of the other materials (e.g., yarns, outer jacket) in the construction. Additionally, the temperature of the electrical fishing line will need to be kept lower than the transformer windings for which this rule of thumb is intended due to touch temperature safety requirements. Given these facts, in order to achieve sufficient power delivery to the camera module while maintaining low power dissipation within the conductors and low temperature within and on the jacket of the electrical fishing line, it is necessary to increase the electrical fishing line voltage beyond 60 V.

If the voltage is greater than 60 V, it can be classified as ES1 if the current in the line is limited to no more than 2 mA. To deliver 1 W to the camera module at a current of less than 2 mA would require a voltage of over 500 V. However, increasing the voltage to this high level presents additional design challenges. The first of these challenges is the voltage that the electrical fishing line can withstand before experiencing dielectric breakdown of the insulating material, or corona discharge effects that will deteriorate the insulating material over time. The thickness and material selection of the insulating material between the two conductors and of the outer jacket will dictate how much voltage can exist across the conductors. The second of these challenges is the availability, size, and efficiency of the voltage conversion electronics that are available or feasible. The voltage conversion electronics will be necessary since the base station module will not have a voltage source in the range of hundreds of volts, and the camera module electronics are not capable of running at high voltages. The third challenge presented with such high voltage is that any capacitance connected to the high voltage presents a safety hazard. To address this, IEC 62368-1 limits the total amount of capacitance that can be connected to a line of a given Energy Source classification (i.e., ES1, ES2, ES3) and voltage. Limiting the capacitance to meet these safety requirements is challenging, as there will be capacitance needed at the output of the step-up converter, the input of the step-down converter, and there will likely be capacitance needed to facilitate communication over the electrical fishing line.

An alternative solution which alleviates some of these challenges is to classify the device as ES2, which increases the allowable current in the line to 25 mA and places no limit on allowable voltage. By selecting a bus voltage of, for example, 250 V, the current in the line can be 6 mA while still allowing for at least 1 W of power delivered to the camera module, after step-down voltage conversion losses and cable Ohmic losses are accounted for. At a 250 V voltage, the allowable bus capacitance on the line is increased to a more feasible level than is allowed if the bus voltage is 500 V or more.

There are several possible techniques which can be implemented to limit the current into the line to less than 25 mA under any loading conditions including short circuit, so as to keep the device within ES2 limits. The first is to select or limit the switching frequency and/or duty cycle and/or inductor and/or transformer of the step-up switching converter such that it is unable to deliver more than 25 mA at voltages greater than 120 V (so as to avoid exceeding the ES2 limits) under all output loading conditions, including short circuit, and also all input voltage levels expected. A second technique is to implement a current limiting circuit utilizing a current sense resistor and various transistors as is commonly found in the output stage of power supplies. A third technique is to implement an active circuit protection device to limit currents, commonly known as an electronic fuse, which uses a MOSFET or other semiconductor device placed in series with the high side or return side of the electrical line, along with current sensing circuitry, in order to limit the maximum current in the line.

There are several possible techniques which can be implemented to alleviate the challenge of complying with the capacitance limits for high voltage lines in 62368-1. First, the capacitors at the input of the step-down voltage converter located at the camera module can be prevented from discharging into the line by placing one or more diodes on one or both of the two conductors connected to the step-down converter. If a full bridge rectifier is placed at the camera module input, this allows for the wires to be polarity agnostic (i.e., the electrical fishing line can be connected to the camera module in either polarity with the same result) while also preventing the step-down converter's input capacitance from discharging back into the electrical fishing line. This is a beneficial feature since both communications architectures presented (10Base-T1L and powerline modems) are also polarity agnostic. Second, the capacitors at the output of the step-up voltage converter located at the base station can be prevented from discharging into the line by using one of the current limiting techniques presented above. Alternatively, the total capacitance at the output of the step-up converter can be reduced by including in the system a capacitance multiplier circuit. These circuits use amplifiers and/or semiconductor devices to remove ripple from signals (such as ripple that would be produced by a switch mode step-up voltage converter) at the expense of additional power consumption. The inclusion of the capacitance multiplier circuit allows for a reduction in the amount of capacitance required at the output of the step-up converter while still achieving the same minimum ripple requirements. Removing ripple from the output of the step-up voltage converter that is supplying the DC voltage for power over the electrical fishing line is important, as this ripple may interfere with the AC signaling used for communication. Third, any capacitors included to allow or improve the use of the communication electronics can be reduced to as small a value as possible.

As an additional safety measure, the video fishing system may include a functionality to remove the high voltage supply from the electrical fishing line in the event that communication is abruptly stopped during normal use. Such an abrupt cessation in communication might be indicative of a mechanical failure or line break of the electrical fishing line, in which case it might be advantageous to remove the high voltage from the conductors for safety reasons since they may be exposed to the user. Additionally, a device could be included within the camera module and/or base station to detect when either is in a disassembled state (and hence accessible to a user) and automatically turn off the high voltage supply.

Computer Vision and Object Identification

The camera module and/or base station and/or electrical bait may include a computer vision system. This system would identify fish species, animals, and other objects of interest in the images captured by the camera module. The identities of these objects could be immediately shared with the angler for informative or entertainment purposes, and/or stored in the memory of the system along with the video and other sensor data.

The computer vision system may also be used to trigger an alarm to alert the angler or other personnel that a fish or other item of interest has been detected. This alarm could use audible, visual, vibrational, or other means to alert the angler or other participants or observers.

Audio Mixing

As mentioned earlier, the camera module and the base station and the electrical bait may contain microphones and/or hydrophones for capturing audio. This audio may be synchronized and/or combined with the video and sensor data for informative or entertainment purposes. The audio from the base station may be combined with the video and/or audio from the camera module and/or electrical bait. This mixing technique would allow, for example, for the audio from the base station (which might include the reactionary dialog of the angler and nearby observers) to be combined with the video and audio from the camera module to create an exciting, entertaining, and informative video.

Multi-Rod Systems

In some embodiments, multiple base stations 404 may be wirelessly connected to each other to allow for multi-camera viewing and control on a single viewing device. In this topology, one base station acts as a master and the others as slaves. The master base station broadcasts a Wi-Fi access point to which the slave base stations connect. One or more Wi-Fi enabled devices, for example a mobile phone or tablet, also connect to the master base station for video viewing and system configuration and control. This setup allows multiple camera modules to be viewed and/or controlled simultaneously on a single Wi-Fi enabled viewing device. Without the master-slave architecture, the viewing device would not be able to view multiple streams simultaneously since it is only capable of connecting to one Wi-Fi access point at a time. The video and control data between the slave base stations and the viewing and control device would be routed through the master base station.

Base Station Charging

The base station and/or fishing rod may also charge from a physical or wireless connection when it is placed in a holder or charger. For example, wireless charging may be enabled with helical coils embedded in the fishing rod and helical coils wrapped around the space in the rack for the rod or the within the walls of the fishing rod holders mounted on the boat.

The methods, systems, and devices discussed above are examples. Various configurations may omit, substitute, or add various procedures or components as appropriate. For instance, in alternative configurations, the methods may be performed in an order different from that described, and that various steps may be added, omitted, or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Embodiments of the present disclosure, for example, are described above with reference to block diagrams and/or operational illustrations of methods, systems, and computer program products according to embodiments of the present disclosure. The functions/acts noted in the blocks may occur out of the order as shown in any flowchart. For example, two blocks shown in succession may in fact be executed substantially concurrent or the blocks may sometimes be executed in the reverse order, depending upon the functionality/acts involved. Additionally, or alternatively, not all of the blocks shown in any flowchart need to be performed and/or executed. For example, if a given flowchart has five blocks containing functions/acts, it may be the case that only three of the five blocks are performed and/or executed. In this example, any of the three of the five blocks may be performed and/or executed.

A statement that a value exceeds (or is more than) a first threshold value is equivalent to a statement that the value meets or exceeds a second threshold value that is slightly greater than the first threshold value, e.g., the second threshold value being one value higher than the first threshold value in the resolution of a relevant system. A statement that a value is less than (or is within) a first threshold value is equivalent to a statement that the value is less than or equal to a second threshold value that is slightly lower than the first threshold value, e.g., the second threshold value being one value lower than the first threshold value in the resolution of the relevant system.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

What is claimed is:

1. An electrically-conductive fishing line comprising:
a first conductor;
a second conductor;
a transmission line primary dielectric element separating the first conductor and the second conductor; and
a waterproof jacket containing the first conductor, the second conductor, and the primary dielectric element,
wherein the primary dielectric element is at least one of textile yarns, fiber yarns, or monofilaments and
wherein the first conductor, the second conductor, and the primary dielectric element form an electrical transmission line in a balanced configuration.

2. The fishing line of claim 1 wherein the first conductor and the second conductor are twisted about the primary dielectric element.

3. The fishing line of claim 1 wherein the first conductor and the second conductor are not twisted about the primary dielectric element.

4. The fishing line of claim 1 wherein power is transmitted over the fishing line using a combination of high voltage and low current.

5. The fishing line of claim 1 further comprising at least one secondary dielectric element.

6. The fishing line of claim 5 wherein the at least one secondary dielectric element is twisted about the primary dielectric element.

7. The fishing line of claim 5 wherein the at least one secondary dielectric element is not twisted about the primary dielectric element.

8. The fishing line of claim 1 having a specific gravity between approximately 0.97 and approximately 2.0.

9. The fishing line of claim 1, the fishing line having a proximal end and a distal end, and comprising a connector at at least one of the proximal end or the distal end.

10. The fishing line of claim 1 wherein the primary dielectric element is a yarn having a strength roughly 1.1 GPa or greater and a modulus 52 GPa or greater.

11. The fishing line of claim 1 wherein at least one of the first or second conductors is uninsulated.

12. The fishing line of claim 1 wherein at least one of the first or second conductors is magnet wire.

13. The fishing line of claim 1 wherein at least one of the first or second conductors is enamel coated.

14. The fishing line of claim 1 wherein the primary dielectric element is also a cable strength member.

15. A video fishing system comprising:
a waterproof camera module;
a base station module; and
the electrically-conductive fishing line of claim 1 connecting the waterproof camera module and the base station module, wherein data is transmitted over the fishing line using 10Base-T1L, Orthogonal Frequency Division Multiplexing, or powerline modem signaling.

16. The video fishing system of claim 15 wherein the waterproof camera module is configured to be a fishing lure.

17. The video fishing system of claim 15 wherein the base station module is integrated into a fishing rod or reel.

18. The video fishing system of claim 15 wherein the camera module has multiple image sensors for creating a panoramic-view image.

19. The video fishing system of claim 15 including an electrical safety mechanism between the fishing line and at least one of the camera module or the base station module.

20. A video fishing system utilizing an electrical fishing line comprising a waterproof jacket containing electrical conductors of size 34 AWG or smaller and configured to send power over the electrical fishing line using a combination of high voltage and low current, including an electrical safety mechanism governing the voltage and/or current on the electrical fishing line.

* * * * *